Jan. 19, 1954
M. C. JOHNSON
2,666,623
ICE BORING DEVICE
Filed Dec. 21, 1950
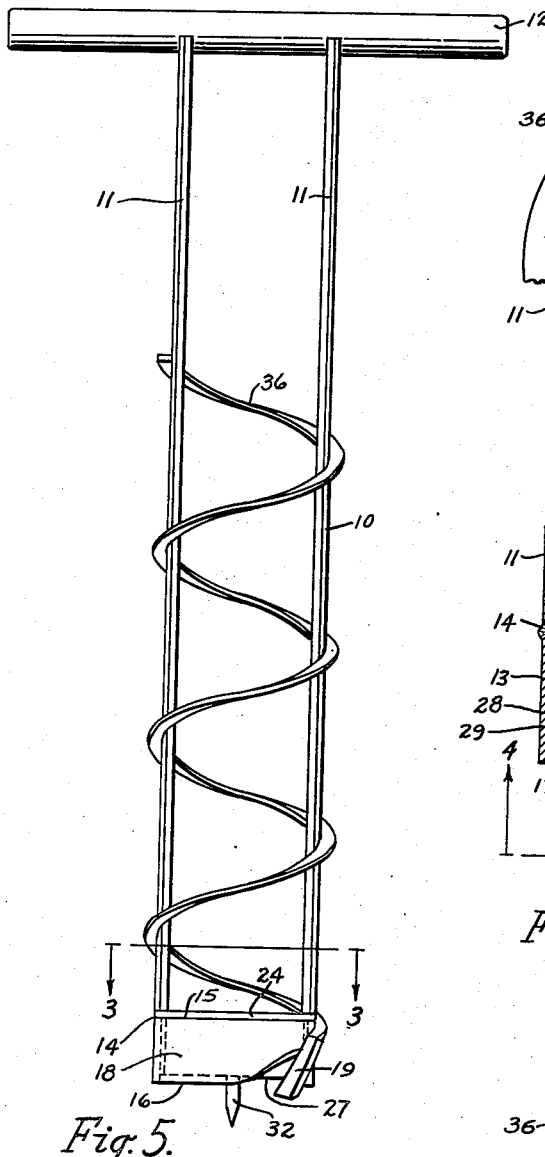
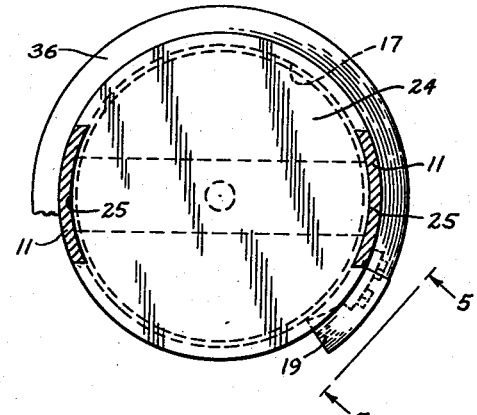
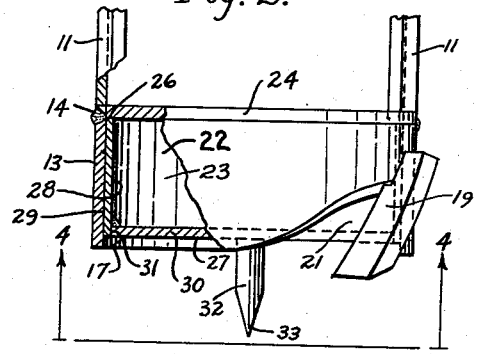
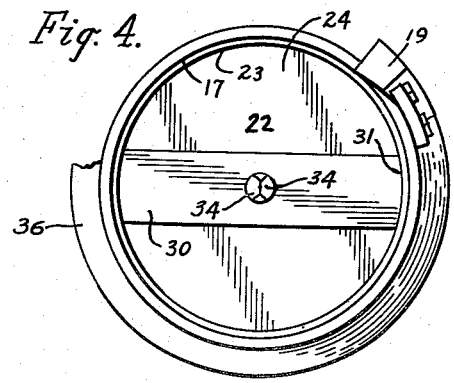
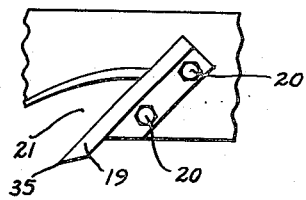
INVENTOR.
MELVIN C. JOHNSON
BY
*G. H. Braddock*
ATTORNEY.

Patented Jan. 19, 1954

2,666,623

UNITED STATES PATENT OFFICE 2,666,623

ICE BORING DEVICE

Melvin C. Johnson, St. Paul, Minn., assignor of one-half to Percy N. Ross, Minneapolis, Minn.

Application December 21, 1950, Serial No. 202,116

1 Claim. (Cl. 255—69)

The invention herein presents a device for boring holes in solid material. It is designed to be particularly useful in cutting holes in natural ice on lakes and streams and therefore will find use to provide holes for use by ice fishermen.

The device operates to cut loose a cylindrical plug of ice which is then easily removed to leave the desired hole.

In the accompanying drawing forming a part of this specification,

Fig. 1 is a side elevational view of the ice boring device;

Fig. 2 is an enlarged fragmentary elevational view of the device;

Fig. 3 is an enlarged sectional view taken on line 3—3 in Fig. 1;

Fig. 4 is a bottom plan view of the device, on the scale of Fig. 3, with the handle removed; and Fig. 5 is an enlarged fragmentary view as seen from the position of line 5—5 in Fig. 3 showing the manner of mounting the cutting blade on the body of the device.

In the disclosed embodiment of the invention, a main body of the device 10 is composed of two curved supporting straps 11, 11, a handle 12 welded to said supporting straps at the tops thereof and an outside annular collar 13 welded to said straps 11, 11 as at 14. The straps 11, 11 and the annular collar 13 are of material of the same thickness and straps 11, 11 are curved so that they form smooth contiguous extensions of the surface of the outer annular collar 13. Collar 13 has an upper edge 15, a lower edge 16, an inner cylindrical surface 17 and an outer cylindrical surface 18. A cutter blade 19 is mounted diagonally on the outer surface 18 of said outer collar 13 as at 20 and said cutter blade 19 extends below the outer edge of the collar. A portion of the collar 13 is removed just forward of the cutting blade as at 21.

A positioning member 22 is freely slidable from position inside the outer annular collar 13 to position between the supporting straps 11, 11. This positioning member 22 includes an inner annular collar 23 of diameter to nest inside of the outer collar 13 and to be easily slidable therein. A plate 24 is welded to the top surface of the inner collar 23 and has the same outside diameter as has the outer collar 13. Portions of plate 24 at opposite sides thereof have been cut away to provide guideways 25, 25 in said plate which are adjacent to and freely slidable along straps 11, 11. Inner collar 23 has an upper edge 26, a lower edge 27, an inner cylindrical surface 28 and an outer cylindrical surface 29. A strap 30 extends across the bottom of inner collar 23 and is welded thereto as indicated at 31. A positioning spike 32 extends downwardly from said strap 30 at a location centrally of the two annular collars. A pointed portion 33 of said spike is generally conical in shape but has flattened sides 34, 34 to provide a chisel-like edge.

The dimensions from top to bottom of the two annular collars are such that when the plate 24 rests against the upper edge of the outer collar 13, the lower edge 27 of the inner collar is spaced from and slightly above the lower edge 16 of the outer collar 13.

The cutter blade 19 is so positioned and constructed as to have a cutting edge 35 lying along a radius of and below collars 13 and 23. Said cutting edge 35 extends from a point lying in vertical alinement with the inner surface 17 of the outer collar 13 to a point spaced outwardly from said outer collar. A helix 36 of rectangular cross-section is welded to the outer sides of the supporting straps 11, 11 and extends from a position contiguous with the top end of the cutter 19 and adjacent the outer annular collar 13 upwardly over a substantial portion of the length of said supporting straps. Said helix extends outwardly from said straps a distance equal to the distance which the cutting blade edge 35 extends outwardly from the contiguous outer surface 18 of the outer collar 13.

In operation the ice boring device is placed in upright position over a spot where a hole through ice is desired to be made. The spike 32 is then forced into the ice by the application of pressure on the plate 24, as by the operator pressing his foot on said plate. The handle 12 is then rotated to cause the outer annular collar 13 to be rotated and the cutting edge 35 of the cutter blade 19 to be forced against the surface of the ice. The spike 32 in the ice serves as a pivot or journal and causes the cutting edge 35 to move in a circle around said spike. The cutter blade 19 causes an annular strip of ice to be removed. As the ice is chipped loose, the device is forced down as it is rotated and the outer annular collar 13 moves down in the groove cut by the cutter blade and around a cylindrical center portion of ice which remains when the annular strip is chipped out. When this happens, the lower edge 27 of the inner collar 23 will be brought in contact with the top surface of the inner cylinder of ice which will prevent further movement of said inner collar in downward direction. As the operation is continued and as the boring device moves deeper into the ice, the positioning member 22 will remain stationary with respect to downward movement and the straps 11, 11 will slide relative to said positioning member. It will be noted that while the positioning member does not go down into the ice as do other parts of the device, the guideways 25, 25 are in contact with the straps 11, 11 and cause the positioning member to be rotated along with the remainder of the device. As soon as a portion of the outer annular collar 13 is beneath the surface of the ice, the inner surface 17 thereof comes in contact with the outer surface of the cylinder of ice and tends to take over the function of the spike 32 in that this inner surface will now tend to guide the cutter blade 19 in its circular path.

As the ice cuttings are forced upwardly by the diagonally mounted cutter blade 19, and as the main body of the device moves into the ice, the helix 36 or a lower portion thereof will cause the cuttings to be elevated. The helix is for carrying the ice cuttings up to the surface of the ice as the device is rotated.

When the ice boring device has completed a cut through the ice, it can be withdrawn and the free cylindrical block of ice can be removed from the hole by lifting out or by pushing down beneath the lower surface of the ice to one side of the hole.

It is obvious that if the cutter blade 19 should become damaged, it can be readily replaced.

What is claimed is:

In a device of the character described, a first annular collar, a pair of supporting straps contiguous with and extending upwardly from said collar, a handle integral with an upper portion of said supporting straps, a cutter blade mounted on and extending below and outwardly from said first collar, a second collar concentric with said first collar and mounted for slidable movement into and out of said first collar and along said supporting straps and fixed against rotative movement with respect to said first collar, and a positioning spike rigid with said second collar and extending downwardly therefrom in concentric relation thereto.

MELVIN C. JOHNSON.

References Cited in the file of this patent

UNITED STATES PATENTS

| Number | Name | Date |
|---|---|---|
| 120,076 | King | Oct. 17, 1871 |
| 144,510 | Cole | Nov. 11, 1873 |
| 286,599 | Fitzgerald | Oct. 16, 1883 |
| 1,099,379 | Keenan | June 9, 1914 |
| 1,857,585 | Brooks | May 10, 1932 |
| 2,329,388 | Brown | Sept. 14, 1943 |
| 2,401,250 | Kandle | May 28, 1946 |